United States Patent [19]
Davidson

[11] Patent Number: 5,165,486
[45] Date of Patent: Nov. 24, 1992

[54] IMPLEMENT LOCK-UP SYSTEM WITH SHOCK-ABSORBING CUSHION SPRINGS

[75] Inventor: Gregory L. Davidson, Devils Lake, N. Dak.

[73] Assignee: Summers Manufacturing Company, Inc., Maddock, N. Dak.

[21] Appl. No.: 729,358

[22] Filed: Jul. 12, 1991

[51] Int. Cl.⁵ .................. A01B 23/04; A01B 63/26
[52] U.S. Cl. ................ 172/499; 172/662; 172/705; 74/97.1; 403/330
[58] Field of Search ............ 172/662, 456, 457, 462, 172/481, 494, 499, 705, 710, 674, 693, 466; 403/330; 292/274, 338; 74/97.1; 280/489

[56] References Cited

U.S. PATENT DOCUMENTS

| | | | |
|---|---|---|---|
| 1,341,240 | 5/1920 | Mattingley | 172/499 |
| 1,733,123 | 10/1929 | Jackoboice | 172/705 |
| 2,755,720 | 7/1956 | Markel | |
| 3,277,967 | 10/1966 | Weispfenning | 172/705 |
| 3,511,319 | 5/1970 | Hansen et al. | 172/662 |
| 3,601,202 | 8/1971 | Steffe | 172/462 |
| 3,633,680 | 1/1972 | Womble | 172/456 |
| 4,213,506 | 7/1980 | Hake | |
| 4,231,433 | 11/1980 | Whitfield et al. | 172/662 |
| 4,316,511 | 2/1982 | Andersen | |
| 4,324,296 | 4/1982 | Schenk et al. | |
| 4,363,363 | 12/1982 | Dyck | 172/705 |
| 4,368,783 | 1/1983 | Hake et al. | 172/705 |
| 4,529,040 | 7/1985 | Grollimund | |
| 4,534,416 | 8/1985 | Johnson | |
| 4,789,123 | 12/1988 | Mattsson | 292/338 |

OTHER PUBLICATIONS

Advertisement: Imperial ® Interchangeable Mulcher Head brochure.

Advertisement: Imperial ® 2700 Series Muchers Brochure, 1979.

*Primary Examiner*—Randolph A. Reese
*Assistant Examiner*—Spencer Warnick
*Attorney, Agent, or Firm*—Merchant, Gould, Smith, Edell, Welter & Schmidt

[57] ABSTRACT

An automatic implement lock-up system with shock absorbing cushion springs for releasably raising and lowering implements mounted to a vehicle. An implement is pivotally attached to a vehicle mounting bracket via an implement support arm. A lock-up bracket is mounted to the implement support arm. A cast swivel is pivotally mounted to the lock-up bracket. A support rod is pivotally attached at a first end to the vehicle mounting brackets and extends through an opening in the cast swivel, whereby the support rod advances freely through the cast swivel when the implement support arm is raised. A support rod spring surrounding the support rod at a location between the vehicle mounting bracket and the cast swivel, whereby the support rod spring provides downward pressure on the implement support arm. A cushioning spring assembly is mounted to the second end of the support rod with an attached cushioning spring surrounding the support rod, interposed between and substantially adjacent to the cushioning spring assembly and the cast swivel. The cushioning spring advances away from the cast swivel when the implement support arm is raised, exposing a portion of the support rod. A lock-up assembly is pivotally attached to the lock-up bracket, whereby a lock-up tensioning spring is engaged to interpose a lock-up clip between the cushioning spring and the cast swivel on the exposed portion of the support rod whenever the implement arm is raised, thereby retaining the implement support arm in the raised position.

14 Claims, 4 Drawing Sheets

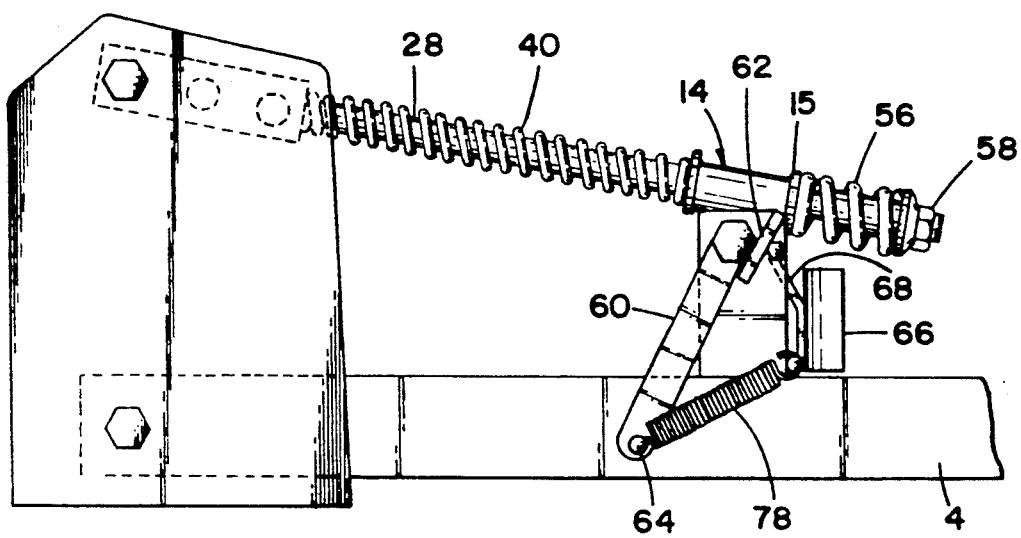
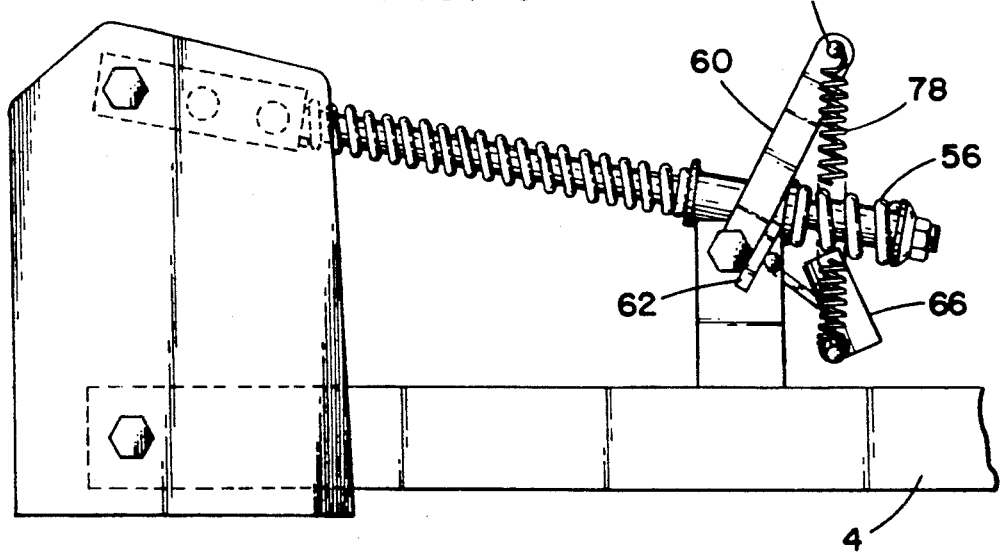

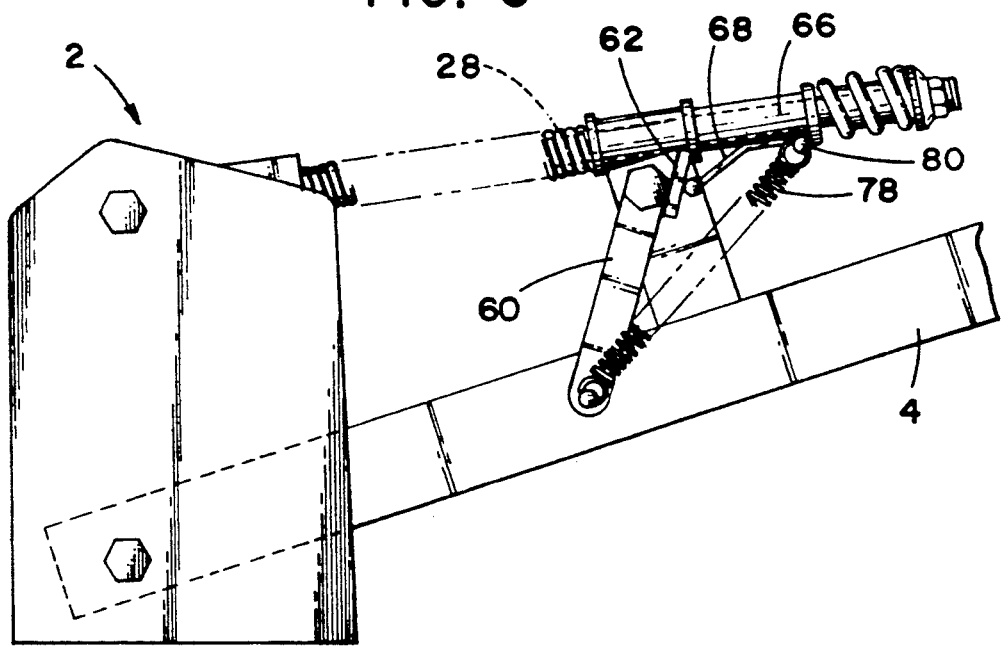

IMPLEMENT LOCK-UP SYSTEM WITH SHOCK-ABSORBING CUSHION SPRINGS

BACKGROUND OF THE INVENTION

The present invention relates to a low-cost automatic implement lock-up system with a shock-absorbing cushioning spring assembly for releasably raising and lowering implements mounted to vehicles which can be operated by a single user.

It is common practice in the farming and construction industries to attach a variety of implements to vehicles. These attachable implements provide low-cost functionality and versatility to existing vehicles. For example, finishing harrows are often attached to the carriage of cultivating machinery.

Several implements may be attached to a single vehicle so that multiple functions can be performed sequentially or simultaneously. In farming applications, a number of variables determine which implement the operator will elect to utilize at a given time, including the operation to be performed, the soil conditions, and the time of year. As a result, the operator needs a method to engage or disengage one or more of the implements, independently. Further, because some implements are mounted close to the ground, they will need to be raised for transport, especially over paved roads.

However, a number of problems exist with present methods for raising implements above the surface of the ground for transport. The prior art discloses methods for manually lifting each of the implements and manually engaging a lock-up mechanism. Because of the weight of many implements, it is often not possible for a single operator to lift the implement and simultaneously activate the lock-up mechanism. Generally, two operators are required, one to raise the implement and another to engage the lock-up mechanism.

In the alternative, a number of automatic systems exist for raising and lowering implements. For example, U.S. Pat. No. 4,534,416 issued to Johnson discloses a hydraulic ram which raises and lowers the entire implement. The hydraulic ram also folds-in lateral extensions or "wings" which contain additional implements. However, automatic raising mechanisms add significant cost and weight to attachable implements. The user must also provide a power source for the raising mechanism, which may not be readily available on the vehicle.

Further, both the manual and automatic lock-up systems of the prior art retain the raised implements in a rigid state. Consequently, during transport over rugged terrain, the implements and their respective mounting structures are subject to potentially damaging shock loads.

SUMMARY OF THE INVENTION

The present invention is directed to an easy to operate and low-cost structure which allows a single operator to raise and lower implements mounted to a vehicle, while protecting the implements from damaging shock loads that occur during transport.

The implement lock-up system of the present invention allows a single operator to activate the lock-up assembly prior to raising or lowering the implement. The automatic nature of the lock-up assembly allows the operator to have both hands free for the raising or lowering of the implement. The automatic implement lock-up system of the present invention works in conjunction with a series of cushioning springs which absorb damaging shock loads that occur during use or transport of the implements and provides downward pressure on the implement when engaged with the soil.

The present invention is particularly suited to mounting secondary soil-working machines to a primary soil-working machine, which are generally pulled behind a tractor. For example, mounted harrows, mounted packers or mounted S-tines can be pivotally attached to the rear of a primary tillage implement. The automatic implement lock-up system allows a single operator to raise and lower the secondary implements independently. The cushioning springs serve a dual function of protecting the implements from damaging shock loads that occur during use or transport and providing downward pressure on the implements during use to maximize their effectiveness.

BRIEF DESCRIPTION OF THE DRAWINGS

FIG. 2 is a side view which illustrates the implement support arm and the automatic implement lock-up system in the lowered state.

FIG. 3 is a side view which illustrates the implement support arm in the lowered state, while the automatic implement lock-up system is configured in the pre-raised state.

FIG. 6 is a side view illustrates the implement support arm in the raised state, while the automatic implement lock-up system is configured in the pre-lowered state.

DETAILED DESCRIPTION OF THE PREFERRED EMBODIMENT

Figure 1:
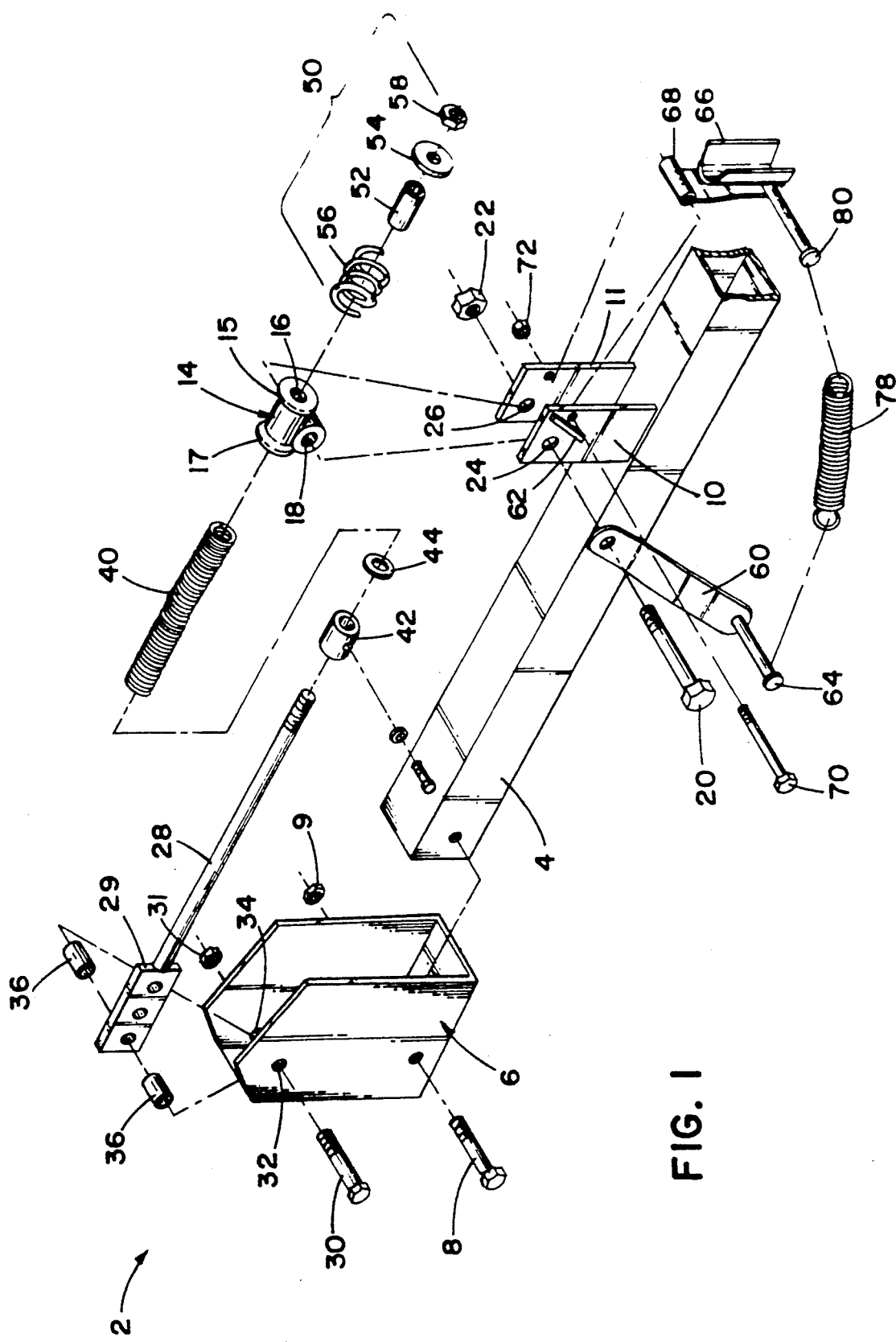
FIG. 1 is a detailed exploded view of the automatic implement lock-up system of the present invention.

FIG. 1 is an exploded view of the automatic implement lock-up system 2 of the present invention. An implement support arm 4 is pivotally attached to vehicle mounting brackets 6 by an implement pivot pin 8 and fastener 9. Vehicle mounting brackets 6 are directly attached to the vehicle (not shown). An implement (not shown) is attached to the other end of the implement support arm 4.

The lock-up mechanism of the present invention consists of lock-up bracket plates 10 and 11 extending upward from the top of the implement support arm 4. The flat surfaces of the lock-up bracket plates 10 and 11 are aligned parallel to the axis of the implement support arm 4 and are attached to the implement support arm 4.

A cast swivel 14 with two adjacent holes at right angles, 16 and 18, is pivotally secured between the lock-up bracket plates 10 and 11 so that the hole 16 is parallel to the axis of the implement support arm 4. The end surfaces 15 and 17 of the cast swivel 14 adjacent to hole 16 are flared and substantially flat. A cast swivel pivot pin 20 passes through holes 24 and 26 in the lock-up bracket plates 10 and 11, respectively, and the hole 18 in the cast swivel 14. The cast swivel pivot pin 20 is retained by a fastener 22.

The threaded end of the elongated support rod 28 passes through hole 16 in the cast swivel 14. The other end of the support rod 28 has a flat surface 29 with a plurality of holes for receiving a support rod pivot pin 30 and fastener 31. A support rod pivot pin 30 passes through holes 32 and 34 in the vehicle mounting brackets 6, one of the holes in the flat surface 29 of the support rod 28, and a pair of tubular pivot pin sleeves 36, which retain the flat surface 29 of the support rod 28 substantially in the center of the space between the vehicle mounting brackets 6.

A support rod spring 40 surrounds the support rod 28. A spacer 42 and washer 44 are interposed between the support rod spring 40 and the support rod flat surface 29. The other end of the support rod spring 40 abuts the substantially flat surface 17 of the cast swivel 14.

Since the support rod 28 is longer than the distance between the support rod pivot pin 30 and the cast swivel 14, the threaded portion of the support rod 28 extends past the end of the cast swivel 14. A cushioning spring assembly 50 is attached to the threaded end of the support rod 28. The cushioning spring assembly 50 comprises a tubular cushioning spring sleeve 52 with a spring washer 54 attached at one end. A cushioning spring 56 surrounds the cushioning spring sleeve 52 and is attached to the spring washer 54, preferably by a spot weld. The opening in the cushioning spring sleeve 52 and spring washer 54 are sized larger then the outside diameter of the support rod 28, serving to maintain a separation between the cushioning spring 56 and the support rod 28. The cushioning spring 56 has substantially flat machined ends to create an even force distribution on the spring washer 54 and the end surface 15 of the cast swivel 14.

A support rod end nut 58 is permanently attached to the outside surface of the spring washer 54, also by a spot weld. The entire cushioning spring assembly 50 is inserted over the end of the support rod 28 so that the threads on the support rod end nut 58 engage with the threads on the end of the support rod 28. The axial position of the cushioning spring assembly 50 relative to the end of the support rod 28 can be adjusted by rotating the support rod end nut 58.

A lock-up lever arm 60 is pivotally attached to the outside surface of the lock-up bracket plate 10 by the cast swivel pivot pin 20. A lever end stop 62 is welded to the outside surface of the lock-up bracket plate 10 to restrict the movement of the lock-up lever arm 60 to approximately 180°. A lock-up lever handle 64 is attached to the end of the lock-up arm 60 to provide the operator with maximum leverage when engaging the automatic implement lock-up system 2.

A lock-up support clip 66 is attached to support clip bracket 68. The support clip 66 is oriented so that the trough portion is positioned directly below and parallel to the support rod 28. The trough portion of the support clip 66 is sized to be slightly larger then the support rod 28, but smaller than the outside diameter of the cushioning spring 56. The support clip bracket 68 is pivotally attached to the lock-up bracket plates 10' and 11 by a support clip pivot pin 70 and fastener 72. When the support clip 66 pivots upward, the trough portion is positioned to engage the support rod 28. Finally, a tensioning spring 78 is attached to the lock-up lever handle 64 at one end and a support clip tensioning arm 80 at the other.

As illustrated in FIG. 2, the implement support arm 4 is in the lowered position. The lock-up lever arm 60 is also in the lowered position. The tensioning spring 78, attached to the lock-up lever handle 64 which rests against the lever end stop 62, biases the support clip bracket 68 and support clip 66 against the lock-up bracket plates 10 and 11. The support rod end nut 58 has been previously adjusted so that the cushioning spring 56 abuts the flat end surface 15 of the cast swivel 14.

The support rod spring 40 provides a positive downward bias on the implement support arm 4 and corresponding implement (not shown). During normal use, the cushioning spring 56 is in contact with the flat end surface 15 of the cast swivel 14. Shock loads are regularly transmitted to the automatic implement lock-up system 2 during use of the implements. Shock loads which are greater than the downward biasing force supplied by the support rod spring 40 will cause the implement support arm 4 to raise upward and the support rod 28 to protrude further past the cast swivel 14. In this configuration, a gap forms between the cushioning spring 56 and the flat end surface 15 of the cast swivel 14. The subsequent downward movement and impact of the implement support arm 4 is absorbed by the cushioning spring 56.

In the lowered position, illustrated in FIG. 2, the cushioning spring 56 rests against the flat end surface 15 of the cast swivel 14, restricting how far the implement support arm can be lowered. The support rod end nut 58 can be rotated to adjust the height of the implement in the lowered position. As the support rod end nut 58 is turned clockwise (further onto the support rod), the support rod 28 is drawn further through the hole 16 in the cast swivel 14, thereby raising the implement support arm 4. Conversely, rotating the support rod end nut 58 counter clockwise will allow the support rod 28 to retract from the cast swivel 14, lowering the implement support arm 4.

As illustrated in FIG. 3, when the operator needs to raise the implement, the lock-up lever arm 60 must first be rotated approximately 180° in a clockwise direction, until the lever arm 60 engages the lever end stop 62. In this configuration, the tensioning spring 78 is elongated and will bias the support clip 66 against the cushioning spring 56. Because the trough portion of the support clip 66 is smaller than the outside diameter of the cushioning spring 56, as illustrated in FIG. 1, only a corner of the support clip 66 actually contacts the cushioning spring.

Figure 4:
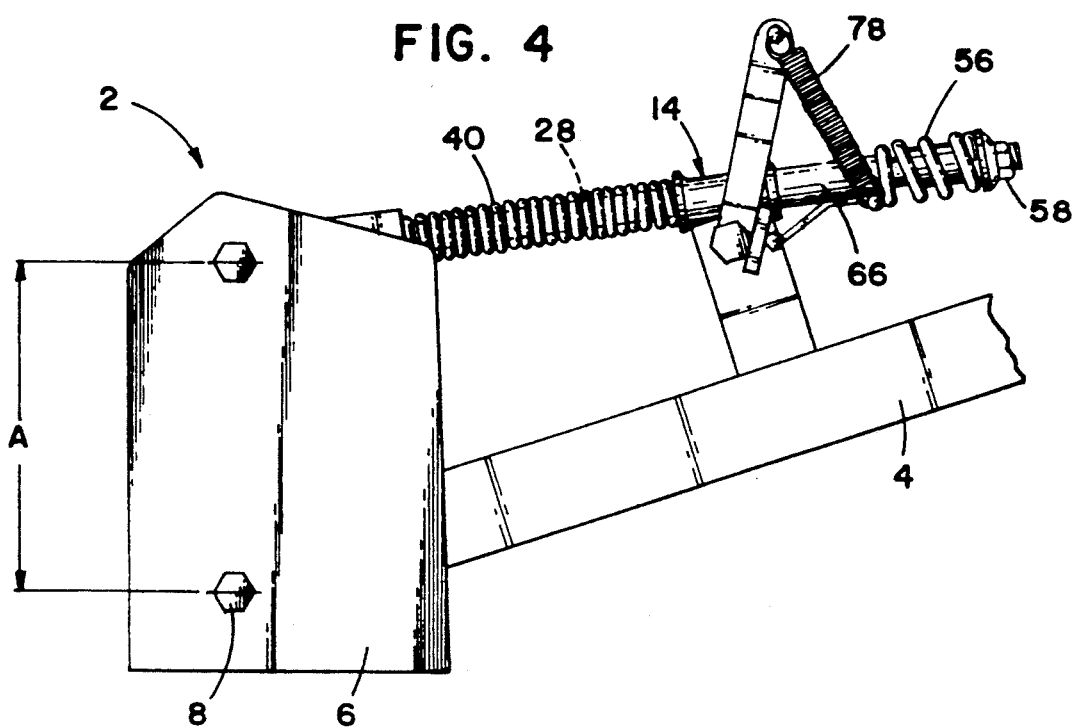
FIG. 4 is a side view which illustrates the implement support arm and the automatic implement lock-up system in the raised and locked-up state.

FIG. 4 illustrates the engagement of the support clip 66 with the support rod 28 that occurs when the implement support arm 4 is in the raised position. Because the support rod 28 is pivotally attached to the vehicle mounting brackets 6 at a distance "A" offset from the implement pivot pin 8, the threaded portion of the support rod 28 will extend further through the cast swivel 14 as the implement support arm 4 is raised, exposing a portion of the support rod 28. As the implement support arm 4 is raised, the tensioning spring 78 forces the support clip 66 to slide off the cushioning spring 56 and to engage with the exposed portion of the support rod 28.

The length of the support clip 66 is configured to match with the length of the support rod 28 which is exposed when the implement support arm 4 is raised to the desired level. As discussed below, by adjusting the support rod end nut 58, the height of the lock-up position of the implement can be changed. For example, turning the support rod end nut 58 clockwise draws the support rod 28 further through the cast swivel 14. Consequently, the implement support arm 4 must be raised further to expose more of the support rod 28 before the support clip 66 can be engaged.

In the locked-up position, the weight of the implement (not shown) and the implement support arm 4 causes the threaded portion of the support rod 28 to move toward the cast swivel 14, causing the support clip 66 to be compressed between the flat end surfaces 15 of the cast swivel 14 and the cushioning spring 56. This compression force retains the support clip 66 in engagement with the exposed portion of the support rod 28.

During transport, the implement is subjected to vertically upward and downward shock loads. The support rod spring 40 absorbs vertically upward shock loads. However, upward shock loads which are greater than the spring force of the support rod spring 40 will cause the implement support arm 4 to rise and the threaded end of the support rod 28 to extend further past the cast swivel 14, thereby exposing a larger portion of the support rod. The compression force that holds the support clip 66 against the exposed portion of the support rod 28 is thereby lost. However, the tensioning spring 78 maintains the support clip 66 in engagement with the exposed portion of the support rod 28 until the implement support arm 4 returns to its nominal position. Downward shock loads cause the portion of the support rod 28 extending past the cast swivel 14 to decrease, compressing the cushioning spring 56.

Figure 5:
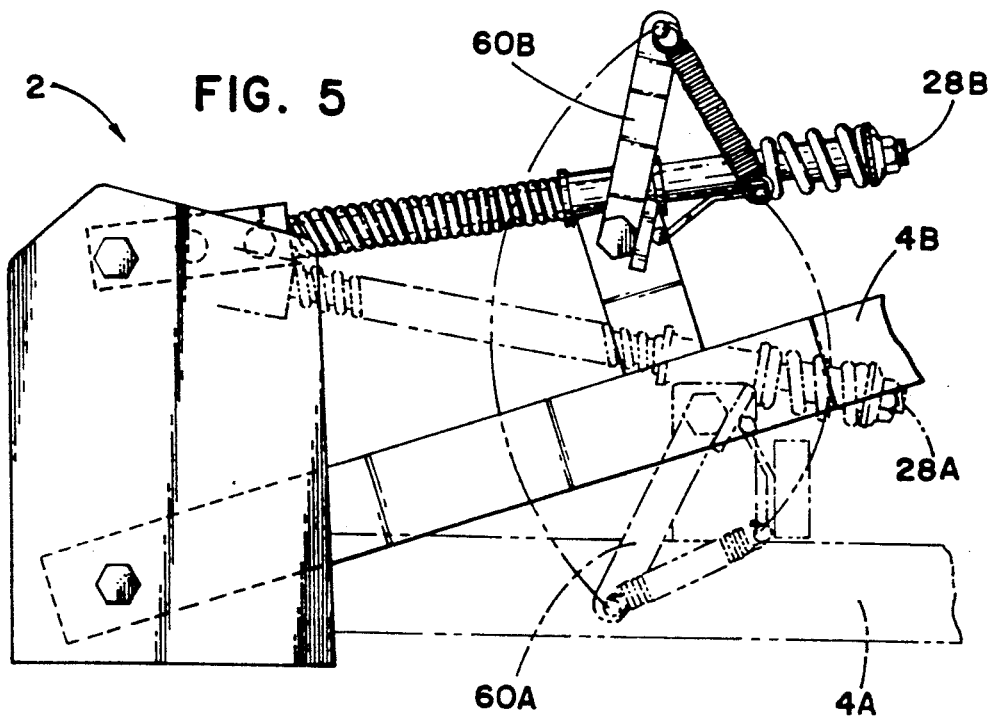
FIG. 5 is a side view illustrates the implement support arm and the automatic implement lock-up system in both the raised and lowered state.

FIG. 5 further illustrates the raising process for the implement lock-up system 2, as discussed above. The lever arm 60A is moved to position 60B. As the operator raises the implement support arm 4A to position 4B, the threaded end of the pivoting support rod 28A extends further past the cast swivel 14 to a position 28B. The bias from the tensioning spring 78 then moves the support clip 66 into engagement with the exposed portion of the support rod 28.

FIG. 6 illustrates the first step in lowering the implement support arm 4. The operator rotates the lock-up lever arm 60 counter clockwise approximately 180° until it engages with the lock-up lever end stop 62. The tensioning spring 78 will bias the support clip 66 downward. In this configuration, the compression force on the support clip 66 discussed above retains the support clip 66 against the support rod 28. The operator merely raises the implement support arm 4 slightly, causing the threaded portion of the support rod 28 to extend further through the cast swivel 14, thereby removing the compression force from the support clip 66. The tensioning spring 78 will then rotate the support clip 66 downward until the support clip tensioning arm 80 contacts the lock-up bracket plate 10. At this point, the automatic implement lock-up system 2 is disengaged and the operator is free to lower the implement support arm 4. When the implement arm 4 is lowered, it will obtain the configuration illustrated in FIG. 2.

While a particular embodiment has been described, it will be appreciated that modifications can be made without departing from the scope of the invention as defined in the appended claims. In particular, it is obvious that the present invention may also be used for various other purposes, including mounting various construction implements or equipment to vehicles.

What is claimed is:

1. Lock-up apparatus for releasably positioning an implement which is pivotally attached to a vehicle by a support arm, comprising:
   counter balancing means for urging the implement toward operational and transport equilibrium positions, said counter balancing means including first and second opposing forcing means, said first forcing means for forcing the implement in a first direction and said second forcing means for forcing the implement in a generally opposite direction such that a separation is formed between said first and second opposing forcing means when the implement is moved toward the transport position, said separation being substantially eliminated when the implement is in the operational position;
   separating means positioned for removable insertion into said separation between said first and second opposing forcing means such that the transport position is established when said separating means is positioned in said separation.

2. Apparatus in accordance with claim 1 wherein said separating means includes third forcing means for forcing said separating means between said first and second opposing forcing means to establish the transport position.

3. Apparatus in accordance with claim 1 wherein said separating means includes fourth forcing means for forcing said separating means from between said first and second opposing forcing means to release the implement to the operational position.

4. Lock-up apparatus for releasably positioning between an operational and a transport position an implement which is pivotally mounted to a vehicle by an implement support arm, the vehicle having a mounting structure, and the implement support arm having a first end pivotally attached to the vehicle support structure and a second end attached to the implement, comprising:
   a swivel pivotally mounted to the implement support arm such that a through opening in said swivel is in the same plane as the axis of the implement support arm, said swivel having a first side generally facing the vehicle and a second side generally facing the implement;
   a support rod having first and second ends, said first end pivotally attached to the vehicle mounting structure at a location off-set from the first end of the implement support arm and a second end extending through said opening in said swivel, whereby said second end of said support rod advances freely through said opening of said swivel when the implement support arm is raised;
   a support rod spring surrounding said support rod at a location between the vehicle mounting structure and said swivel, whereby said support rod spring provides downward pressure on the implement support arm;
   means for cushioning the implement, said cushioning means including a cushioning spring surrounding said support rod at a location between said second side of said swivel and said second end of said support rod, and holding means for holding said cushioning spring with respect to said second end of said support rod, whereby a separation is formed between said cushioning spring and said second side of said swivel when the implement support arm is raised exposing a portion of said support rod; and
   means for locking up the implement in the transport position, said locking up means being a lock-up clip pivotally attached to the implement support arm which may be inserted into said separation formed between said cushioning spring and said swivel when the implement support arm is raised, thereby retaining the implement in the transport position and cushioning it against shock.

5. The lock-up apparatus of claim 4 wherein said means for locking up further includes a lock-up tensioning spring capable of biasing said lock-up clip toward said separation.

6. The lock-up apparatus of claim 4 including means for adjusting the location of said cushioning spring with respect to said second end of said support rod.

7. The lock-up apparatus of claim 4 wherein said holding means includes:
 a cushioning spring sleeve with an outside diameter sized to be inserted in one end of said cushioning spring and an inside diameter sized to receive said second end of said support rod; and
 means for mounting said cushioning spring to said cushioning spring sleeve.

8. The lock-up apparatus of claim 7 wherein said cushioning spring sleeve includes a first threaded portion and said second end of said support rod includes a second threaded portions, said first and second threaded portions engaging one another, whereby the axial location of the cushioning means is variable with respect to said support rod.

9. The lock-up apparatus of claim 4 wherein said cushioning means is positioned to absorb downward shock loads when the implement support arm is in the orthogonal position.

10. The lock-up apparatus of claim 9 wherein said cushioning means is positioned to absorb downward shock loads when the implement support arm is in the transport position.

11. The lock-up apparatus of claim 4 wherein said lock-up support clip includes first and second ends spaced apart substantially the length of said separation when the implement support arm is raised to the desired transport position.

12. The lock-up apparatus of claim 11 wherein said locking up means includes a lock-up lever arm pivotally attached to the implement support arm proximate said swivel to move alternatively between a transport activation position and an operational activation position, said lock-up tensioning spring connected to said lock-up lever arm at one end and said lock-up clip at the other for biasing said lock-up clip toward said separation in said transport activation position and a way from said separation in said operational activation position.

13. A method for using a lock-up apparatus for releasably positioning an implement which is pivotally attached to a vehicle by a support arm between operational and transport positions, said lock-up apparatus including first and second opposing forcing means, said first forcing means urging the implement in a first direction and said second forcing means urging said implement in a generally opposite direction such that a separation is formed between said first and second opposing forcing means when the implement is moved toward the transport position, said lock-up apparatus further including separating means for maintaining said separation between said first and second opposing forcing means so that the transport position is established, and biasing means for alternatively biasing said separating means toward said separation and away from said separation, comprising the steps of:
 biasing said separating means toward said first and second opening forcing means;
 moving the implement from the operational position to the transport position thereby forming said separation between said first and second opposing forcing means; and
 inserting said separating means into said separation between said first and second opposing forcing means.

14. Method in accordance with claim 13 further comprising the steps of:
 biasing said separating means way from said separation;
 lifting the implement to increase the separation between said first and second opposing forcing means, thereby allowing said biasing means to remove said separating means from said separation; and
 lowering the implement to the operational position.

* * * * *

UNITED STATES PATENT AND TRADEMARK OFFICE
CERTIFICATE OF CORRECTION

PATENT NO. : 5,165,486

DATED : November 24, 1992

INVENTOR(S) : Gregory L. Davidson

It is certified that error appears in the above-identified patent and that said Letters Patent is hereby corrected as shown below:

In column 7, line 21, "portions" should read --portion--.

In column 7, line 28, "orthogonal" should read --operational--.

In column 8, line 24, "opening" should read --opposing--.

Signed and Sealed this

Thirty-first Day of May, 1994

Attest:

BRUCE LEHMAN

Attesting Officer

Commissioner of Patents and Trademarks